US009662866B2

(12) United States Patent
Sasaki et al.

(10) Patent No.: US 9,662,866 B2
(45) Date of Patent: May 30, 2017

(54) COVER TAPE (75) Inventors: Akira Sasaki, Isesaki (JP); Hisatsugu Tokunaga, Isesaki (JP); Tetsuo Fujimura, Isesaki (JP)

(73) Assignee: DENKA COMPANY LIMITED, Tokyo (JP)

( * ) Notice: Subject to any disclaimer, the term of this patent is extended or adjusted under 35 U.S.C. 154(b) by 864 days.

(21) Appl. No.: 13/703,920

(22) PCT Filed: Apr. 18, 2011

(86) PCT No.: PCT/JP2011/059545
§ 371 (c)(1),
(2), (4) Date: Dec. 13, 2012

(87) PCT Pub. No.: WO2011/158550
PCT Pub. Date: Dec. 22, 2011

(65) Prior Publication Data
US 2013/0089746 A1 Apr. 11, 2013

(30) Foreign Application Priority Data

Jun. 15, 2010 (JP) ................. 2010-135799
Jun. 15, 2010 (JP) ................. 2010-135800

(51) Int. Cl.
*B32B 27/08* (2006.01)
*B32B 27/28* (2006.01)
(Continued)

(52) U.S. Cl.
CPC ............. *B32B 27/28* (2013.01); *B32B 27/08* (2013.01); *B32B 27/30* (2013.01); *B32B 27/308* (2013.01);
(Continued)

(58) Field of Classification Search
CPC ................ C09J 7/0296; C09J 2201/162; C09J 2205/114; C09J 2431/00; C09J 2431/006; C09J 2433/00; B32B 27/36; B32B 27/34
(Continued)

(56) References Cited

U.S. PATENT DOCUMENTS

2010/0266826 A1* 10/2010 Yonezawa ................. B32B 7/02
428/216

FOREIGN PATENT DOCUMENTS

JP   4 279466   10/1992
JP   7 223674   8/1995
(Continued)

OTHER PUBLICATIONS

International Search Report Issued Jul. 26, 2011 in PCT/JP11/59545 Filed Apr. 18, 2011.

*Primary Examiner* — Ellen S Wood
(74) *Attorney, Agent, or Firm* — Oblon, McClelland, Maier & Neustadt, L.L.P.

(57) ABSTRACT

Disclosed is a cover tape which comprises at least a base layer (A), an intermediate layer (B), a peeling layer (C), the primary component of which is a thermoplastic resin, and a heat seal layer (D), the primary component of which is a thermoplastic resin that can be heat sealed to a carrier tape. The tensile storage modulus (c) of the thermoplastic resin that constitutes the peeling layer (C) is within the range of $1 \times 10^6$ Pa to $1 \times 10^8$ Pa. The tensile storage modulus (d) of the thermoplastic resin that constitutes the heat seal layer (D) is within the range of $1 \times 10^8$ Pa to $1 \times 10^{10}$ Pa. The ratio of (c) and (d) satisfies $1 \times 10^4 \geq (d)/(c) \geq 1 \times 10$. This kind of cover tape has the appropriate peel strength and sufficiently low fluctuation in peel strength when heat sealed to a thermoplastic resin carrier tape. Therefore, the tape will not tear even under shock caused by high-speed peeling, and sticking of electronic parts does not occur even when set aside for (Continued)

a long period of time of 24 to 72 hours in a high-temperature environment of 60 to 80° C.

16 Claims, 1 Drawing Sheet

(51) Int. Cl.
*B32B 27/30* (2006.01)
*B32B 27/32* (2006.01)
*B32B 27/36* (2006.01)

(52) U.S. Cl.
CPC .............. *B32B 27/32* (2013.01); *B32B 27/36* (2013.01); *Y10T 428/31504* (2015.04); *Y10T 428/31786* (2015.04); *Y10T 428/31855* (2015.04); *Y10T 428/31935* (2015.04)

(58) Field of Classification Search
USPC .... 428/335, 336, 347, 349, 354, 474.9, 35.7
See application file for complete search history.

(56) References Cited

FOREIGN PATENT DOCUMENTS

| | | | |
|---|---|---|---|
| JP | 8 192886 | | 7/1996 |
| JP | 8 258888 | | 10/1996 |
| JP | 2000 327024 | | 11/2000 |
| JP | 2002 154573 | | 5/2002 |
| JP | 2004-025483 | * | 1/2004 |
| JP | 2005 178073 | | 7/2005 |
| JP | 2005 263257 | | 9/2005 |
| JP | 2006-206071 | * | 8/2006 |
| JP | 2006 219137 | | 8/2006 |
| KR | 10-2010-0028672 A | | 3/2010 |

* cited by examiner

Fig. 1

Fig.2

COVER TAPE

TECHNICAL FIELD

The present invention relates to a cover tape for use in packages of electronic parts.

BACKGROUND ART

With the miniaturization of electronic devices, electronic parts used therein have also become smaller with higher performance, and parts are being automatically mounted onto printed substrate boards in assembly processes of electronic devices. Electronic parts for surface mounting are stored in a carrier tape on which embossed pockets are consecutively formed according to the shapes of the electronic parts to enable storage thereof. After the electronic parts are stored, a cover tape is applied to the top of the carrier tape as a lid material, and the two ends of the cover tape are continuously heat sealed in the direction of the length using a heated seal bar to make a package. As the material for the cover tape, a laminate of a thermoplastic resin heat seal layer laminated on a substrate of a biaxially drawn polyester film or the like is used.

In recent years, various electronic parts such as capacitors, resistors, IC's, LED's, connectors and switching elements have become remarkably smaller, lighter and thinner, and when there is a large difference between the maximum and minimum values of the peeling strength when peeling a cover tape, i.e., when the variability in the peeling strength is great, the carrier tape will vibrate strongly, which may cause the electronic parts to pop out and result in poor mounting. Additionally, with the sharp rise in mounting speed, the peeling rate of the cover tape has also become 0.1 sec/tact or less, which is extremely high, so when peeling, the cover tape is subjected to great impact stress. As a result thereof, when the peeling strength is too strong, the cover tape may break. On the other hand, when the peeling strength is too weak, the cover tape and carrier tape do not adhere with sufficient strength, so vibrations during transportation or mounting may cause the cover tape to peel off, the electronic parts may fall out, resulting in poor mounting of the electronic parts.

As a countermeasure against tape breakage, a method of providing a layer with superior impact resistance and tear propagation resistance, such as polypropylene, nylon or polyurethane, between the substrate of, for example, a biaxially drawn polyester film, and the heat seal layer has been proposed (see Patent Document 1). However, even with this method, it was difficult to sufficiently suppress tape breakage when peeling the cover tape from the carrier tape at the above high speed.

Moreover, due to the storage of the cover tape or the transportation or storage environment of the package containing the electronic parts, the temperature and humidity may affect the peeling strength, which may increase or decrease over time and fall outside the appropriate range.

Further, in order to remove the moisture in an encapsulation resin from the package storing the electronic parts, a baking treatment is needed. In order to improve the mass producibility of such electronic parts, the baking temperature needs to be increased and the baking time needs to be decreased, and baking treatments are performed these days in a 60° C. environment for about 72 hours or a 80° C. environment for about 24 hours with the cover tape being heat sealed to the carrier tape. Under these circumstances, electronic parts may become stuck to the heat sealing surface of the cover tape, and poor mounting may occur when mounting the parts on a substrate.

In view of the circumstances, there is an increasing need for a tape having an appropriate peeling strength and sufficiently low variability in the peeling strength, which does not break due to impacts from high-speed peeling, to which electronic parts do not stick even in the above high-temperature environment, and which has a highly stable peeling strength.

As methods of providing stable peeling strength, a method of making the heat seal layer into a sea-island pattern, a method of mixing an incompatible resin into the intermediate layer or the heat seal layer to cause cohesive failure in the layer, and a method of subjecting the heat sealing surface to a corona treatment to adjust the wettability of the surface have been proposed (see Patent Documents 2-5). However, they did not take into consideration the sticking of electronic parts to the cover tape when a package storing the parts is stored in a high-temperature environment.

On the other hand, there has been a proposal of a lid material wherein a static diffusion layer is provided between the intermediate layer and the heat seal layer, the static diffusion layer comprising a thermoplastic resin such as a polyester resin, polyurethane resin, vinyl chloride-vinyl acetate copolymer resin or acrylic resin, to which an electrically conductive microparticle or a surfactant is added; wherein static that occurs when peeling the cover tape from a carrier tape is suppressed due to peeling between the intermediate layer and the static diffusion layer, cohesive failure of the static diffusion layer, or peeling between the heat seal layer and the static diffusion layer (see Patent Document 2). However, while a cover tape with good sealing properties with a carrier tape is discussed in Patent Document 2, there is no discussion regarding any methods for suppressing the variability in the peeling strength.

Additionally, there has been a proposal of a cover tape which has low variability in the peeling strength and is capable of suppressing peeling charge by providing a static induction prevention layer between the intermediate layer and the heat seal layer (Patent Document 6). However, Patent Document 6 is not clear regarding the resins constituting the intermediate layer, the static induction prevention layer and the sealant layer, nor does it mention the variability in the peeling strength.

Moreover, the presence or absence of parts, the direction in which the parts are stored, and defects or bending of leads are sometimes examined with the electronic parts stored in a package. With the miniaturization of electronic parts, in order to examine the parts stored in a package, the cover tape needs to have high transparency.

In response to this demand, a cover tape with transparency has been proposed (see Patent Document 7). However, due to the addition of relatively large electrically conductive microparticles, such as tin oxide or zinc oxide, in the heat seal layer for preventing static buildup, the transparency of the cover tape is reduced, and most of the cover tapes as described have a haze value exceeding 20%, so a cover tape with a higher transparency was in need.

RELATED ART DOCUMENTS

Patent Documents

Patent Document 1: JP-A 2000-327024
Patent Document 2: JP-A H7-223674
Patent Document 3: JP-A H4-279466

Patent Document 4: JP-A 2006-219137
Patent Document 5: JP-A H8-192886
Patent Document 6: JP-A 2005-178073
Patent Document 7: JP-A H8-258888

SUMMARY OF THE INVENTION

Problem to be Solved by Invention

The object of the present invention is to provide a cover tape which, when being heat sealed to a carrier tape made of plastic such as polystyrene or polycarbonate, has an appropriate peeling strength and low variability in the peeling strength, does not break due to impacts from high-speed peeling, to which electronic parts do not stick even when placed for a long period of time in a high-temperature environment, has superior properties with respect to the stability of the peeling strength over time, and has high transparency as necessary.

Means for Solving the Problem

As a result of diligent studies on the above problems, the present inventors discovered that a cover tape overcoming all of the above problems could be obtained by providing, between an intermediate layer and a heat seal layer comprising specific resins, a peeling layer comprising another resin composition, appropriately adjusting the mutual relationship between the tensile storage moduli of the peeling layer and the heat seal layer, and adding a carbon nanomaterial as an electrically conductive material in the peeling layer or heat seal layer as necessary, which led to the present invention.

In other words, the present invention is a cover tape comprising at least a base layer (A), an intermediate layer (B), a peeling layer (C) which comprises a thermoplastic resin as a main component, and a heat seal layer (D) which comprises a thermoplastic resin as a main component heat-sealable to a carrier tape, wherein the thermoplastic resin forming the peeling layer (C) has a tensile storage modulus (c) of at least $1\times10^6$ Pa and at most $1\times10^8$ Pa at 23° C.; the thermoplastic resin forming the heat seal layer (D) has a tensile storage modulus (d) of at least $1\times10^8$ Pa and at most $1\times10^{10}$ Pa at 23° C.; and the ratio between (c) and (d) is $1\times10^4 \geq (d)/(c) \geq 1\times10$. The tensile storage modulus (c) of the thermoplastic resin forming the peeling layer (C) is measured by the method described in section 9.4 of JIS K 7244-1-1996.

Moreover, one embodiment of the present invention provides a cover tape comprising at least a base layer (A), an intermediate layer (B), a peeling layer (C), and a heat seal layer (D) which is heat-sealable to a carrier tape, wherein the intermediate layer (B) comprises, as a main component, a linear low density polyethylene which is polymerized using a metallocene catalyst and has a tensile modulus of at most 200 MPa; and the peeling layer (C) comprises an electrically conductive material as well as a hydrogenated resin of an aromatic vinyl-conjugated diene copolymer containing 15 to 35 mass % of an aromatic vinyl group as a main component.

The intermediate layer (B) preferably comprises a linear low density polyethylene resin with a density of 0.900 to $0.925\times10^3$ kg/m$^3$. Additionally, it is further preferred that the resin constituting the intermediate layer (B) comprise a metallocene linear low density polyethylene resin.

The thermoplastic resin constituting the peeling layer (C) preferably comprises any one of, or a combination of two or more of, an acrylic resin, a polyester resin, an ethylene-vinyl acetate copolymer resin, an ethylene-acrylic acid copolymer resin, an ethylene-methacrylic acid copolymer resin, a styrene-butadiene copolymer resin and a hydrogenated resin thereof, and a styrene-isoprene copolymer resin and a hydrogenated resin thereof. Moreover, the thermoplastic resin constituting the heat seal layer (D) preferably comprises any one of, or a combination of two or more of, an acrylic resin, an ester resin and a styrene resin.

At least one of the peeling layer (C) and the heat seal layer (D) preferably comprises 2 to 15 parts by mass of a carbon nanomaterial with respect to 100 parts by mass of the thermoplastic resin constituting the layer. Moreover, it is further preferred that the carbon nanomaterial added to at least one of the peeling layer (C) and the heat seal layer (D) be a carbon nanofiber.

Moreover, at least one of the peeling layer (C) and the heat seal layer (D) preferably has a microparticle for imparting electrical conductivity to metal oxides as an electrically conductive microparticle, and the surface resistivity of a surface of the heat seal layer is preferably $1\times10^4$ to $1\times10^{12} \Omega$ when the peeling layer (C) and the heat seal layer (D) are in a laminated state. It is further preferred that the electrically conductive microparticle be antimony-doped tin oxide.

On the other hand, the heat seal layer (D) preferably comprises 20 to 100 parts by mass of an inorganic filler with a median size (D50) of 50 to 300 nm with respect to 100 parts by mass of the thermoplastic resin of the heat seal layer (D). Additionally, the cover tape of the present invention preferably has optical properties of a total light transmittance of at least 70%, and a haze value of at most 30%, preferably at most 15%.

Moreover, the present invention includes a package of electronic parts wherein the above cover tape is used as a lid material for a carrier tape comprising a thermoplastic resin.

Effects of the Invention

The cover tape of the present invention provides a cover tape which maintains a heat seal to a carrier tape made of plastic, such as polystyrene or polycarbonate, and a stable peeling strength even for a long period of time after heat sealing, has excellent transparency, and is capable of greatly suppressing the sticking of stored parts to the cover tape even after prolonged aging in a high-temperature environment, e.g., 60 to 80° C. In addition, according to one embodiment of the present invention, since the peeling layer (C) contains an electrically conductive material, even when storing minute and light-weight electronic parts in a carrier tape, problems during the mounting process, such as electronic parts popping out due to static charging of the cover tape when peeled, can be suppressed.

BEST MODES FOR CARRYING OUT THE INVENTIONS

Figure 1:
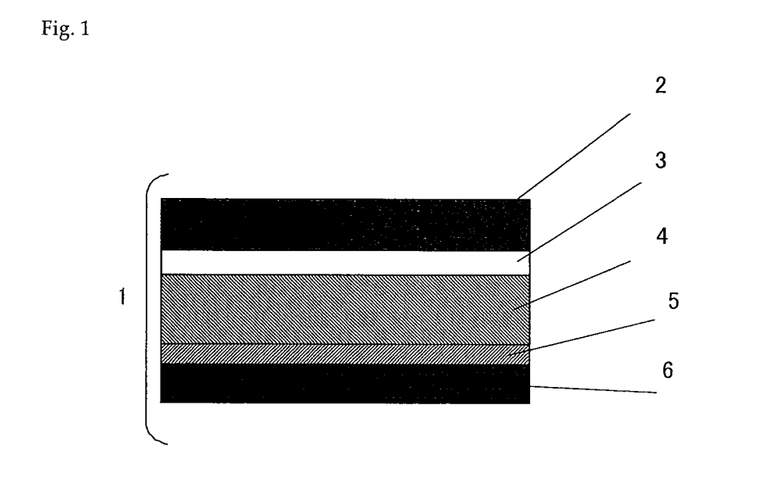
FIG. 1 is a cross-sectional view showing an example of a layered structure of the cover tape of the present invention.
Figure 2:
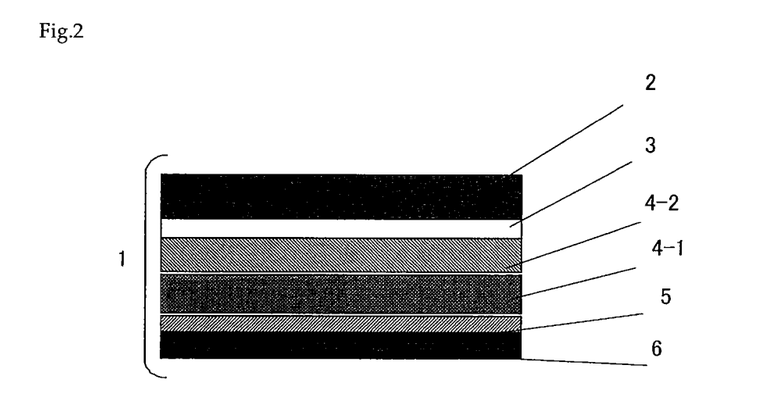
FIG. 2 is a cross-sectional view showing another example of a layered structure of the cover tape of the present invention.

The cover tape of the present invention comprises at least a base layer (A), an intermediate layer (B), a peeling layer (C) and a heat seal layer (D). An example of the structure of the cover tape of the present invention is shown in FIG. 1.

The base layer (A) comprises a biaxially drawn polyester or biaxially drawn nylon, and in particular, biaxially drawn polyethylene terephthalate (PET), biaxially drawn polyethylene naphthalate (PEN), biaxially drawn 6,6-nylon, 6-nylon, and biaxially drawn polypropylene may be preferably used. As for the biaxially drawn PET, biaxially drawn PEN, biaxially drawn 6,6-nylon, biaxially drawn 6-nylon and biaxially drawn polypropylene, in addition to those commonly used, those coated with or mixed with an antistatic agent for antistatic treatment, and those subjected to a corona treatment or an easy-adhesion treatment may be used. When the base layer is too thin, the tensile strength of the cover tape itself is low, so "film breakage" tends to occur when peeling the cover tape. On the other hand, when it is too thick, not only does the adhesiveness of the cover tape become low, the costs increase, so usually a base layer with a thickness of 12 to 25 µm may be preferably used.

In the present invention, an intermediate layer (B) is provided on one surface of the base layer (A) optionally with an anchor coat layer in between. As the resin constituting the intermediate layer (B), a resin, which in particular has flexibility and an appropriate rigidity, is a linear low density polyethylene (hereafter referred to as "LLDPE") with a high tear strength at normal temperature, and has a density in the range of 0.900 to $0.925 \times 10^3$ kg/m$^3$, is used. When the density is less than $0.900 \times 10^3$ kg/m$^3$, the intermediate layer (B) tends to protrude from the edges of the cover tape due to the heat and pressure of the heat seal during heat sealing of the cover tape, which can easily lead to contamination of the heat sealing iron. On the other hand, when the density is higher than $0.925 \times 10^3$ kg/m$^3$, the intermediate layer (B) does not become soft enough during heat sealing of the cover tape, so there is great variability in the peeling strength when peeling the cover tape.

LLDPE's include those polymerized via a Ziegler catalyst and those polymerized via a metallocene catalyst (hereafter referred to as "m-LLDPE"). Since m-LLDPE allows the molecular weight distribution to be narrowly controlled, the occurrence of tackiness associated with low crystallization and unnecessary reduction of the melting point can be suppressed, and it in particular has high tear strength. Among them, those having a tensile modulus of at most 200 MPa calculated based on the tensile stress changes at a strain of 3% to 6% measured at a tension speed of 100 mm/min in the direction of the flow of the film using a JIS K 6251 dumbbell No. 1 test piece are used. The intermediate layer (B) alleviates the variability in the iron pressure when applying a heating iron to the cover tape during heat sealing of the cover tape to a carrier tape, and evenly adheres to the base layer and peeling layer to thereby provide the effect of suppressing variability in the peeling strength when peeling the cover tape. However, when the tensile modulus exceeds 200 MPa, the adhesion between the m-LLDPE constituting the intermediate layer and the thermoplastic resin constituting the peeling layer (C) becomes uneven, which leads to variability in the peeling strength when peeling the cover tape.

For the intermediate layer (B) of the present invention, use of m-LLDPE is preferred. Moreover, use of a linear low density polyethylene which is polymerized using a metallocene catalyst and has a tensile modulus of at most 200 MPa is further preferred.

The above m-LLDPE is a copolymer having, as comonomers, an ethylene and an olefin having at least 3 carbon atoms, preferably an a-olefin that is linear, branched or substituted by an aromatic nucleus having 3 to 18 carbon atoms. Examples of linear monoolefins include propylene, 1-butene, 1-pentene, 1-hexene, 1-octene, 1-nonene, 1-decene, 1-dodecene, 1-tetradecene, 1-hexadecene and 1-octadecene. Additionally, examples of branched monoolefins may include 3-methyl-1-butene, 3-methyl-1-pentene, 4-methyl-1-pentene and 2-ethyl-1-hexene. Moreover, examples of monoolefins substituted by an aromatic nucleus include styrenes. These comonomers may be copolymerized, alone or as a combination or two or more, with ethylene. In the copolymerization, a polyene, such as butadiene, isoprene, 1,3-hexadiene, dicyclopentadiene, or 5-ethylidene-2-norbornene, may be copolymerized. Those using 1-hexene or 1-octene as a comonomer have high tensile strength and are cost-friendly, and may therefore be preferably used. The 1 to 20 mol % of the a-olefin content in the copolymer is preferred for its effect of sufficiently improving tape breakage, and the content is more preferably 10 to 15 mol %.

The thickness of the above intermediate layer (B) is generally 5 to 50 µm, and is preferably 10 to 40 µm. When the thickness of the intermediate layer (B) is less than 5 µm, the adhesive strength between the base layer (A) and intermediate layer (B) may be insufficient, and when it exceeds 50 µm, the total thickness of the cover tape is high, so it may be difficult to obtain a sufficient peeling strength when heat sealing the cover tape to a carrier tape.

The cover tape of the present invention provides a peeling layer (C) comprising a thermoplastic resin as a main component between the intermediate layer (B) and heat seal layer (D). The thermoplastic resin used in the peeling layer (C) comprises any one of, or a combination of, an acrylic resin, a polyester resin, an ethylene-vinyl acetate copolymer resin (hereafter referred to as "EVA"), an ethylene-acrylic acid copolymer resin, an ethylene-methacrylic acid copolymer resin, a styrene-butadiene copolymer resin, and a hydrogenated resin of an aromatic vinyl-conjugated diene copolymer. Among the resins, those with a tensile storage modulus of at least $1 \times 10^6$ Pa and at most $1 \times 10^8$ Pa at 23° C. room temperature are particularly preferred, and those with a modulus of $1 \times 10^6$ Pa to $5 \times 10^7$ Pa are more preferred. When the modulus is less than $1 \times 10^6$ Pa, the layer is too soft, so the peeling layer can be easily damaged when peeling the cover tape from a carrier tape, and when the modulus exceeds $1 \times 10^8$ Pa, the layer is too hard, so it is difficult to obtain peeling stability. Additionally, the tensile storage moduli of the peeling layer (C) and the below-described heat seal layer (D) are obtained by measuring the viscoelasticity spectrum of the thermoplastic resin or thermoplastic resin composition used in the respective layer in the following conditions based on the description of section 9.4 of JIS K 7244-1-1996.

Thickness of test piece: 200 µm (Part 4)
Frequency: 10 Hz
Vibration mode:
Rate of temperature rise: 12° C./min As the thermoplastic resin used in the peeling layer (C), even among the above resins, an olefin-styrene block copolymer resin comprising olefin at a proportion of 50 to 85 mass % may be preferably used. This copolymer resin may be a hydrogenated resin of a styrene-conjugated diene block copolymer, examples of which include a hydrogenated resin of a styrene-butadiene block copolymer, a hydrogenated resin of a styrene-butadiene-styrene triblock copolymer, a hydrogenated resin of styrene-isoprene diblock copolymer, a hydrogenated resin of a styrene-isoprene-styrene triblock copolymer, a hydrogenated resin of a styrene-butadiene random copolymer, and a hydrogenated resin of a styrene-isoprene random copolymer. Among them, those using a hydrogenated resin of a styrene-isoprene-styrene triblock copolymer (hereafter referred to as "SEPS"), a hydrogenated resin of a styrene-butadiene-styrene triblock copolymer (hereafter referred to as "SEBS") or a resin wherein a specific part of the butadiene is selectively hydrogenated (hereafter referred to as "SBBS") can markedly improve the adhesiveness with the intermediate layer (B), and can also improve the adhesiveness between the peeling layer (C) and heat seal layer (D). Moreover, the thermoplastic resin used in the peeling layer (C) comprises a hydrogenated resin of a styrene-conjugated diene copolymer, and has a density in the range of 0.890 to $0.920 \times 10^3$ kg/m$^3$, which may be preferably 0.905 to $0.920 \times 10^3$ kg/m$^3$. Additionally, the mass average molecular weight may be between 50,000 to 150,000.

In addition, the thermoplastic resin used in the peeling layer (C) may be a hydrogenated resin of an aromatic vinyl-conjugated diene copolymer comprising 15 to 35 mass % of an aromatic vinyl group. In an example of the cover tape of the present invention, peeling is performed between the peeling layer (C) and heat seal layer (D). However, when the aromatic vinyl group content is less than 15 mass %, while the adhesiveness with the m-LLDPE constituting the intermediate layer (B) is good, the adhesiveness with the heat seal layer (D) is insufficient, and the peeling strength required for a cover tape cannot be obtained. On the other hand, when the aromatic vinyl group content exceeds 35 mass %, due to changes in the heat by the heating iron during heat sealing, the adhesiveness between the peeling layer (C) and heat seal layer (D) tends to change rapidly, the intended peeling strength becomes difficult to obtain, and the peeling strength can easily vary when peeling the cover tape.

The thickness of the peeling layer (C) is usually in the range of 0.1 to 3 μm, preferably 0.1 to 1.5 μm. When the thickness of the peeling layer (C) is less than 0.1 μm, the heat seal layer (D) may not exhibit sufficient peeling strength. On the other hand, when the thickness of the peeling layer (C) exceeds 3 μm, costs can rise easily, and the peeling strength can easily vary when peeling the cover tape. Additionally, as described below, the peeling layer (C) and the heat seal layer (D) are usually formed by coating, and when formed by a coating method, the thickness here refers to the thickness after drying.

For the cover tape of the present invention, the heat seal layer (D) comprising a thermoplastic resin as a main component is formed on a surface of the peeling layer (C). Examples of the thermoplastic resin of the heat seal layer (D) include acrylic resins, polyester resins, styrene resins and ethylene-vinyl acetate copolymer resins. Among them, acrylic resins have excellent heat sealing properties to polystyrenes, polycarbonates and polyester resins, which are materials constituting carrier tapes. In particular, resins having a glass transition temperature of 45 to 80° C. are preferably used, and acrylic resins having a glass transition temperature of 50 to 75° C. are more preferably used.

Additionally, the tensile storage modulus measured by the same method as in the case of the above peeling layer (C) is preferably at least $1 \times 10^8$ and at most $1 \times 10^{10}$ Pa at a room temperature of 23° C. By using such a resin and adding an inorganic filler, it is possible to obtain a product to which electronic parts hardly stick in a temperature environment of 60 to 80° C., and has superior heat sealing properties to a polystyrene or polycarbonate carrier tape.

The acrylic resin constituting the heat seal layer (D) may be a resin wherein at least one of acrylic acid esters such as methyl acrylate, ethyl acrylate, propyl acrylate and butyl acrylate; and methacrylic acid esters such as methyl methacrylate, ethyl methacrylate, propyl methacrylate, butyl methacrylate and cyclohexyl methacrylate is polymerized, or a resin wherein two or more of the above are copolymerized. The polyester resin may be a resin wherein a dicarboxylic acid such as terephthalic acid, isophthalic acid, succinic acid, glutaric acid or adipic acid is condensation polymerized with a dialcohol such as ethylene glycol, propylene glycol, butylene glycol, cyclohexanedimethanol, or a resin wherein two or more of the above are copolymerized. Moreover, a polyethylene elastomer wherein a dicarboxylic acid and polyethylene glycol are condensation polymerized may be used. Additionally, a resin comprising at least 50 mass % of at least one acrylic residue, such as the above acrylic acid esters and methacrylic acid esters, or a resin wherein two or more of the above are copolymerized, e.g., a resin such as an acryl-styrene copolymer, may be used.

The thickness of the heat seal layer (D) is within the range of 0.1 to 5 μm preferably 0.1 to 3 μm, and more preferably 0.1 to 0.5 When the thickness of the heat seal is less than 0.1 μm, the heat seal layer (D) may not exhibit sufficient peeling strength. On the other hand, when the thickness of the heat seal layer exceeds 5 μm, not only do costs rise, but the peeling strength tends to become more variable when peeling the cover tape.

The peeling layer (C) and/or the heat seal layer (D) may comprise an electrically conductive material, preferably electrically conductive microparticles, as necessary. Examples of electrically conductive microparticles include electrically conductive tin oxide particles, electrically conductive zinc oxide particles and electrically conductive titanium oxide particles. Among them, antimony-, phosphorous- or gallium-doped tin oxide exhibits high electrical conductivity, and causes little reduction in transparency, and therefore are more preferably used. The electrically conductive tin oxide particles, electrically conductive zinc oxide particles and electrically conductive titanium oxide particles may be spherical or acicular, or a mixture thereof. In particular, when using antimony-doped tin oxide, a cover tape having good antistatic performance can be obtained. The amount of electrically conductive microparticles added is usually 100 to 1000 parts by mass, preferably 200 to 800 parts by mass, to 100 parts by mass of the thermoplastic resin constituting the peeling layer (C) and/or the heat seal layer (D). When the amount of the electrically conductive microparticles is less than 100 parts by mass, there is a possibility that the surface resistivity of the cover tape on the side of the heat seal layer (D) will exceed $10^{12}\Omega$, and when it exceeds 1000 parts by mass, the relative amount of the thermoplastic resin is reduced, so it may be difficult for the heat seal to provide sufficient peeling strength, and costs will rise.

The peeling layer (C) and/or the heat seal layer (D) may comprise, as an electrically conductive material, at least one carbon nanomaterial of carbon nanotubes and carbon nanofibers. Among them, carbon nanofibers with an aspect ratio of 10 to 10000 are preferred. The amount of the carbon nanomaterial added to the peeling layer (C) and/or the heat seal layer (D) is 0.5 to 15 parts by mass, preferably 2 to 15 parts by mass, and more preferably 3 to 10 parts by mass, to 100 parts by mass of the thermoplastic resin constituting the layer. When the amount is less than 0.5 parts by mass, the addition of the carbon nanomaterial may not provide enough electrical conductivity. On the other hand, an amount exceeding 15 parts by mass will lead to rising costs and reduced transparency of the cover tape, so it will be difficult to inspect stored parts through the cover tape. By the above means, the cover tape of the present invention should have a haze value of at most 30%, preferably at most 15%, enabling stored parts to be inspected for defects etc. through the cover tape.

In the present invention, the tensile storage modulus (c) of the resin forming the above peeling layer (C) at 23° C. and the tensile storage modulus (d) of the heat seal layer (D) at 23° C. have a (d)/(c) ratio in the range of $1\times10^4 \geq (d)/(c) \geq 1\times 10$. By keeping it within this range, when peeling a cover tape of a structure of the present invention heat sealed on a surface of a carrier tape, the location where peeling occurs can be stably obtained between the intermediate layer (B) and the peeling layer (C). Therefore, peeling can be carried out with low variability in the peeling strength.

In order to remove the moisture in an encapsulation resin while the cover tape of the present invention is heat sealed to a surface of a carrier tape containing electronic parts as described above, a baking treatment may be performed in conditions such as 72 hours in a 60° C. environment or 24 hours in a 80° C. environment. If the contents, i.e., the electronic parts, stick to the cover tape in this situation, it will cause problems during the process of peeling the cover tape and mounting the electronic parts. While the cover tape of the present invention as described above has low variability in the peeling strength and enables control of the tackiness of the heat seal layer to the electronic part contents when storing for a long period of time at a high temperature such as 60 to 80° C., in order to more certainly prevent sticking, an inorganic filler is preferably added to the heat seal layer (D).

The inorganic filler added is a spherical or crushed inorganic filler, such as talc particles, silica particles, alumina particles, mica particles, calcium carbonate and magnesium carbonate. In particular, silica particles enable an intended particle size of the present invention to be obtained easily, have good dispersibility, and lead to little reduction in transparency when added to the heat seal layer (D), so they may be preferably used. In particular, it is more preferred that silica microparticles be surface-treated by at least one aliphatic oxide-modified polysiloxane selected from the group consisting of propylene oxide-modified polysiloxanes or ethylene oxide-modified polysiloxanes. By treating the surface of the inorganic filler with the polysiloxane, the adhesion between the resin constituting the heat seal layer (D) and the inorganic filler becomes stronger. Therefore, the mechanical strength of the heat seal layer (D) can be improved, and a stable peeling strength can be easily obtained when peeling the cover tape from a carrier tape.

Regarding the above inorganic filler, 10 to 50 parts by mass of an inorganic filler with a median size (D50) of less than 50 nm, or 20 to 60 parts by mass or 20 to 100 parts by mass of an inorganic filler with a median size (D50) of 50 to 300 nm, is preferably included with respect to 100 parts by mass of the thermoplastic resin constituting the heat seal layer (D). Additionally, if an inorganic filler with a median size (D50) of less than 200 nm is included in, for example, 10 to 50 parts by mass, the transparency of the cover tape can be maintained. By including an inorganic filler of such a particle size in the heat seal layer (D), not only can blocking during rolling of the cover tape be suppressed, but sticking of electronic parts to the cover tape even when the packages storing the electronic parts are kept in a high-temperature environment can be more certainly prevented. Moreover, by adding fillers of varying particle sizes, in addition to the above suppressing effect on the sticking of stored parts, reductions in the transparency of the cover tape can be suppressed. Therefore, printing on electronic parts stored in a carrier tape and bent leads of the electronic parts etc. can be inspected through the cover tape.

There are no particular restrictions to the method for producing the above-mentioned cover tape, and a general method may be used. For example, an anchor coating agent such as polyurethane, polyester, polyolefin or polyethyleneimine can be applied to a surface of, for example, a biaxially drawn polyester film of a base layer (A), and a resin composition for forming an intermediate layer (B) comprising m-LLDPE as a main ingredient can be T-die extruded to coat the surface coated with the anchor coating agent to thereby form a two-layer film comprising a base layer (A) and an intermediate layer (B). Further, on the surface of the intermediate layer (B), a peeling layer (C) of the present invention may be coated by, for example, a gravure coater, a reverse coater, a kiss coater, an air knife coater, a Meyer bar coater or a dip coater. In this situation, the surface of the intermediate layer (B) is preferably subjected to a corona treatment or ozone treatment prior to coating, and the corona treatment is particularly preferred. Further, a resin composition constituting a heat seal layer (D) may be coated on the peeling layer (C) applied to the intermediate layer (B) by, for example, a gravure coater, a reverse coater, a kiss coater, an air knife coater, a Meyer bar coater or a dip coater to obtain an intended cover tape.

As another method, a film for the intermediate layer (B) may be preliminarily formed by a T-die casting method or an inflation method, it can then be adhered to a film for the base layer (A) via an anchor coating agent such as polyurethane, polyester or polyolefin using a dry laminating method to obtain a film comprising the base layer (A) and intermediate layer (B), and an intended cover tape may also be obtained by coating the surface of the intermediate layer (B) with a peeling layer (C) and heat seal layer (D).

As yet another method, an intended cover tape may be obtained by a sand lamination method. That is, first, a film constituting a first intermediate layer is formed by a T-die casting method or an inflation method. Then a resin composition comprising a melted m-LLDPE as a main component is provided between the first intermediate layer film and a base layer (A) film to form and laminate a second intermediate layer. After obtaining a laminated film constituted by the base layer (A) and the intermediate layer (B) comprising the first intermediate layer and second intermediate layer of the intended cover tape, a peeling layer (C) and a heat seal layer (D) are further applied to the surface on the side of the intermediate layer (B) to allow the intended cover tape to be obtained. Similar to the above methods, the surface of the side of the film of the base layer (A) to be laminated is also generally coated with an anchor coating agent in cases where this method is used.

In addition to the above steps, at least one side of the cover tape may be subjected to an antistatic treatment as necessary. Examples of the antistatic agent include surfactant type antistatic agents such as anionic, cationic, nonionic and betaine antistatic agents, polymer antistatic agents and electrically conductive materials, which can be applied by a roll coater using a gravure roller, a lip coater or spray etc. Additionally, in order to evenly apply the antistatic agent, the surface of the film is preferably subjected to a corona discharge treatment or ozone treatment before the antistatic treatment, and the corona discharge treatment is particularly preferred.

The cover tape is used as a lid material for a carrier tape which is a container for storing electronic parts. The carrier tape is an 8 mm to 100 mm-wide strip-shaped product having recessed portions for storing electronic parts. When heat sealing the cover tape as a lid material, the material constituting the carrier tape is not particularly restricted, and commercially available materials may be used. For example, polystyrenes, polyesters, polycarbonates and polyvinyl chloride may be used. The carrier tape may be one wherein carbon black or a carbon nanotube is blended with the resin to impart electrical conductivity, one wherein an antistatic agent or a electrically conductive material is blended, or one wherein antistatic properties are imparted by coating a surface with a coating solution containing a surfactant type antistatic agent or an electrically conductive material such as polypyrrole or polythiophene dispersed in an organic binder such as acrylic.

A package storing electronic parts may be obtained by, for example, storing the electronic parts etc. in the electronic part storage portions of the carrier tape, then using the cover tape as a lid material, continuously heat sealing the two edges of the cover tape in a longitudinal direction to form a package, and then winding it around a reel. Electronic parts packaged in this form are stored and transported. The package of the present invention can be used for the storage and transportation of various electronic parts such as connectors, IC's, diodes, transistors, capacitors, resistors and LED's. In particular, for electronic parts with a thickness of 1 mm or less such as LED's, transistors and diodes, it can greatly suppress problems when mounting the electronic parts. The cover tape is peeled off a little at a time while the package storing the electronic parts etc. is being conveyed using the apertures for feeding on the edges in the longitudinal direction of the carrier tape, and the electronic parts etc. can be taken out while verifying their presence, orientations and positions by a pick up device.

Further, when peeling off the cover tape, if the peeling strength is too low, it can become peeled from the carrier tape, and the parts stored therein may fall out, and if the peeling strength is too high, it will be difficult to peel the cover tape from the carrier tape and the cover tape may break during the peeling operation. Therefore, when heat sealed at 120 to 220° C., the peeling strength is preferably 0.05 to 1.0 N, and more preferably 0.1 to 0.7 N, and the variability in the peeling strength is preferably below 0.4 N, and more preferably below 0.3 N.

EXAMPLES

The present invention shall be explained below with reference to examples, but the present invention is not limited by these examples.

In the examples and comparative examples, the following resin ingredients were used in the intermediate layers (B), peeling layers (C) and heat seal layers (D). Additionally, the tensile storage moduli of the resins of the peeling layer (C) and the resins of the heat seal layers (D) were storage modulus values obtained by measuring each resin using a viscoelasticity measuring instrument (SOLIDS ANA-LYZER RSAII, manufactured by Rheometric Scientific) and a method in accordance with section 9.4 of JIS K 7244-1-1996.

(Measurement Conditions)
Thickness of test piece: 200 μm (Part 4)
Frequency: 10 Hz
Vibration mode:
Rate of temperature rise: 12° C./min After dissolving or diluting test pieces [c-1] to [c-4] in cyclohexane, [c-5] in water and [d-1] to [d-3] in MEK, they were applied to polytetrafluoroethylene plates, placed in an environment of a temperature of 60° C. for 12 hours, the resulting products were then taken out, left for 24 hours at a temperature of 23° C. in an atmosphere with a relative humidity of 50%, and then measured.

(Intermediate Layer (B) Resin)
(a-1) m-LLDPE: UMERIT 0520F (manufactured by Ube-Maruzen Polyethylene), thickness: 40 μm, density: $0.904 \times 10^3$ kg/m$^3$
(a-2) m-LLDPE: HARMOREX NF464N (manufactured by Japan Polyethylene Corporation), thickness: 40 μm, density: $0.918 \times 10^3$ kg/m$^3$
(a-3) m-LLDPE: UMERIT 2540F (manufactured by Ube-Maruzen Polyethylene), thickness: 40 μm, density: $0.923 \times 10^3$ kg/m$^3$
(a-4) m-LLDPE: EVOLUE SP3010 (manufactured by Prime Polymer Co., Ltd.), thickness: 30 μm, density: $0.926 \times 10^3$ kg/m$^3$
(a-5) m-LLDPE: EXCELLEN FX CX1001 (manufactured by Sumitomo Chemical Co., Ltd.), thickness: 40 μm, density: $0.898 \times 10^3$ kg/m$^3$ (Peeling Layer (C) Resin)
(c-1) resin: TUFTEC H1141 (manufactured by Asahi Kasei Chemicals Corporation), SEBS, storage modulus at 23° C.: $2 \times 10^7$ Pa
(c-2) resin: SEPTON 2002 (manufactured by Kuraray Co., Ltd.), SEPS, storage modulus at 23° C.: $1 \times 10^7$ Pa
(c-3) resin: TUFTEC P1500 (manufactured by Asahi Kasei Chemicals Corporation), SBBS, storage modulus at 23° C.: $1 \times 10^7$ Pa
(c-4) resin: TUFTEC H1221 (manufactured by Asahi Kasei Chemicals Corporation), SEBS, storage modulus at 23° C.: $1 \times 10^6$ Pa
(c-5) resin: EVAFLEX VA-45X (manufactured by Du Pont-Mitsui Polychemicals Co., Ltd.), EVA, storage modulus at 23° C.: $8 \times 10^6$ Pa
(c-6) resin: VYLONAL MD-1245 (manufactured by Toyobo Co., Ltd.), polyester resin, storage modulus at 23° C.: $1 \times 10^9$ Pa
(c-7) resin: VYLON 630 (manufactured by Toyobo Co., Ltd.), polyester resin, storage modulus at 23° C.: $2 \times 10^9$ Pa
(c-8) resin: PESRESIN A-645 GH (manufactured by Takamatsu Oil & Fat Co, Ltd.), polyester resin, storage modulus at 23° C.: $8 \times 10^8$ Pa
(c-9) resin: TUFTEC H1051 (manufactured by Asahi Kasei Chemicals Corporation), SEBS, storage modulus at 23° C.: $1 \times 10^8$ Pa
(c-10) resin: TUFTEC P2000 (manufactured by Asahi Kasei Chemicals Corporation), SBBS, storage modulus at 23° C.: $6 \times 10^8$ Pa (c-11) resin: TUFTEC H1043 (manufactured by Asahi Kasei Chemicals Corporation), SEBS, storage modulus at 23° C.: $3\times10^8$ Pa
(c-12) resin: SEPTON 8104 (manufactured by Kuraray Co., Ltd.), SEBS, storage modulus at 23° C.: $5\times10^8$ Pa
(Electrically Conductive Material Added in Peeling Layer (C))
(c-13) electrically conductive material: SNS-10T (manufactured by Ishihara Sangyo Kaisha, Ltd.), spherical antimony-doped tin oxide, median size (D50): 100 nm, toluene dispersion type
(c-14) electrically conductive material: FSS-10T (manufactured by Ishihara Sangyo Kaisha, Ltd.), acicular antimony-doped tin oxide, number average major axis: 2 μm, toluene dispersion type
(c-15) electrically conductive material: FS-10D (manufactured by Ishihara Sangyo Kaisha, Ltd.), acicular antimony-doped tin oxide, number average major axis: 2 μm, water dispersion type
(Heat Seal Layer (D) Resin)
(d-1) acrylic resin 1: DIANAL BR-116 (manufactured by Mitsubishi Rayon Co., Ltd.), glass transition temperature: 50° C., storage modulus at 23° C.: $2\times10^9$ Pa
(d-2) acrylic resin 2: DIANAL BR-113 (manufactured by Mitsubishi Rayon Co., Ltd.), glass transition temperature: 75° C., storage modulus at 23° C.: $1\times10^{10}$ Pa
(d-3) acrylic resin 3: DIANAL BR-1122 (manufactured by Mitsubishi Rayon Co., Ltd.), glass transition temperature: 27° C., storage modulus at 23° C.: $2\times10^8$ Pa
(Agent Added in Heat Seal Layer (D))
(Electrically Conductive Material Added in Heat Seal Layer (D))
(d-4) electrically conductive material: CNF-T/Anone (manufactured by Mitsubishi Materials Corporation), carbon nanofiber, diameter: 10 to 20 nm, number average major axis: 0.1 to 10 μm
(Inorganic Filler Added in Heat Seal Layer (D))
(e-1) inorganic filler 1: MEK-ST-ZL (manufactured by Nissan Chemical Industries, Ltd.), silica filler, median size (D50): 100 nm Example 1

[(a-1) m-LLDPE] polymerized using a metallocene was used as a resin ingredient, kneaded at 200° C. using single screw extruder having a 40 mm-bore, and extruded through a T-die at a line rate of 20 m/min to obtain a 40 μm-thick intermediate film. After coating a surface of a 12 μm-thick biaxially drawn polyester film with a polyester anchor coating agent by a gravure method, the above intermediate film [(a-1) m-LLDPE] was applied to obtain a laminated film comprising a biaxially drawn polyester layer and a m-LLDPE layer. Next, the m-LLDPE surface of the film was subjected to a corona treatment, then [(c-1) resin], which was dissolved in cyclohexane, was applied to the corona treated surface by a gravure method such that the thickness after drying would be 0.8 μm to thereby form a peeling layer. Further, as a heat seal layer on the coated surface of the peeling layer, the butyl methacrylate and methyl methacrylate random copolymer [(d-1) acrylic resin] and [(e-1) inorganic filler] were mixed to achieve a solid content ratio (d-1) : (e-1) of 100 : 80 and dissolved in MEK, and the resulting solution was applied by a gravure method such that the thickness after drying would be 1.0 μm to obtain a cover tape having antistatic performance for carrier tapes.

Example 2

As shown in Table 1, the electrically conductive material (c-14) was added to the peeling layer at 400 parts by mass to 100 parts of the resin, and other than the compounding ratio and composition listed in Table 1, a cover tape was produced in the same manner as in Example 1.

Examples 3 to 9 and Comparative Examples 2 to 10

Other than forming intermediate layers, peeling layers and heat seal layers using the ingredients, such as the resins, listed in Tables 1 and 2, cover tapes were produced in the same manner as in Example 1.

Comparative Example 1

Other than sequentially forming a peeling layer and a heat seal layer on a 50 μm-thick base layer without providing an intermediate layer, a cover tape was produced in the same manner as in Example 1.

Comparative Example 11

Other than forming an intermediate layer and a heat seal layer using the ingredients, such as the resins, listed in Table 2 without providing a peeling layer, a cover tape was produced using the compounding ratio and composition shown in Table 2 in the same manner as in Example 1.

Comparative Example 12

Other than forming an intermediate layer and a peeling layer using the ingredients, such as the resins, listed in Table 2 without providing a heat seal layer, a cover tape was produced using the compounding ratio and composition shown in Table 2 in the same manner as in Example 1.

Example 10

[(a-1) m-LLDPE] polymerized using a metallocene was used as a resin ingredient, kneaded at 200° C. using single screw extruder having a 40 mm-bore, and extruded through a T-die at a line rate of 20 m/min to obtain a 40 μm-thick intermediate film. After coating a surface of a 12 μm-thick biaxially drawn polyester film with a polyester anchor coating agent by a gravure method, the above intermediate film [(a-1) m-LLDPE] was applied to obtain a laminated film comprising a biaxially drawn polyester layer and a m-LLDPE layer. Next, the m-LLDPE surface of the film was subjected to a corona treatment, then [(c-1) resin], which was dissolved in cyclohexane, was applied to the corona treated surface by a gravure method such that the thickness after drying would be 1 μm to thereby form a peeling layer. Further, as a heat seal layer on the coated surface of the peeling layer, the butyl methacrylate and methyl methacrylate random copolymer [(d-1) acrylic resin], [(d-4) electrically conductive material] and [(e-1) inorganic filler] were mixed to achieve a solid content ratio (d-1): (d-4): (e-1) of 100:8:50 and dissolved in MEK, and the resulting solution was applied by a gravure method such that the thickness after drying would be 0.8 µm to obtain a cover tape having antistatic performance for carrier tapes.

Examples 11 to 17 and Comparative Examples 14, 15 and 17 to 23

Other than forming intermediate layers, peeling layers and heat seal layers using the ingredients, such as the resins, listed in Tables 3 and 4, cover tapes were produced in the same manner as in Example 10.

Comparative Example 13

Other than sequentially forming a peeling layer and a heat seal layer on a 50 µm-thick base layer without providing an intermediate layer, a cover tape was produced in the same manner as in Example 10.

Comparative Example 16

Other than using the composition listed in Table 4 without adding the electrically conductive material and inorganic filler in the heat seal layer, a cover tape was produced in the same manner as in Example 10.

Comparative Example 24

Other than forming an intermediate layer and a peeling layer using the composition listed in Table 4 without providing a heat seal layer, a cover tape was produced in the same manner as in Example 10.

(Evaluation Method)

The cover tapes for electronic part carrier tapes produced in the examples and comparative examples were each evaluated in the following manner. The results are summarized in Tables 1, 2, 3 and 4.

(1) Haze value

Haze values were measured in accordance with measurement method A of JIS K 7105: 1998 using an integrating sphere measuring device. For those for which a haze value could not be evaluated because a film could not be obtained due to remarkably poor film formability, they were marked as "not evaluated". The results are shown in the haze value section of Tables 1, 2, 3 and 4.

(2) Part attachment 20 electronic parts (SOD-882: 1.0 mm×0.6 mm) were placed on a polystyrene carrier tape (manufactured by Denki Kagaku Kogyo Kabushiki Kaisha) at a temperature of 23° C. in an atmosphere with a relative humidity of 50%, a cover tape was placed over it such that the heat seal layer was in contact with the parts, and 500 g weights were used to evenly distribute the load (25 g for each part). After one minute, the cover tape was lifted, and the number of parts stuck to the heat seal surface was counted. "Excellent" was given to cover tapes to which the number of stuck parts was in the range of 0 to 5, "good" was given those in the range of 6 to 10, and "poor" was given to those in the range of 10 to 20. The results are shown in the part attachment section of Tables 1, 2, 3 and 4.

(4) Sealing properties

A taping machine (ETM-480, Shibuya Kogyo Co., Ltd.) was used to heat seal a 5.5 mm-wide cover tape to a 8 mm-wide polycarbonate carrier tape (manufactured by Denki Kagaku Kogyo Kabushiki Kaisha) or a polystyrene carrier tape (manufactured by Denki Kagaku Kogyo Kabushiki Kaisha) at a seal head width of 0.5 mm×2, a seal head length of 32 mm, a sealing pressure of 0.1 MPa, a feeding length of 4 mm, and a sealing time of 0.1 sec×8, using a sealing iron temperature of 140° C. to 190° C. in 10° C. intervals. After leaving them for 24 hours at a temperature of 23 ° C. in an atmosphere with a relative humidity of 50%, the cover tapes were peeled at the same temperature of 23° C. in the same atmosphere with a relative humidity of 50% at a rate of 300 mm/min and a peeling angle of 180° . "Excellent" was given to those with an average peeling strength in the range of 0.3 to 0.9 N when being heat sealed at sealing iron temperatures of 140° C. and 190° C., "good" was given to those with an average peeling strength in the range of 0.3 to 0.9 N when being heat sealed at either a sealing iron temperature of 140° C. or 190° C., and "poor" was given to those with an average peeling strength outside the above-mentioned range. The results are shown in the sealing properties section of Tables 1, 2, 3 and 4.

(5) Stability over time

Heat sealing was performed in the same conditions as in the above section (4) sealing properties such that the peeling strength was 0.4 N. The resulting products were placed in an environment with a temperature of 60° C. and a relative humidity of 10%, and in an environment with a temperature of 60° C. and a relative humidity of 95% for 7 days, removed, then left for 24 hours at a temperature of 23° C. in an atmosphere with a relative humidity of 50%, and then peeling strength was measured at the same temperature of 23° C. in the same atmosphere with a relative humidity of 50%. The peeling strength measurement was performed in the same conditions as in the above section (4) sealing properties. "Excellent" was given to those with an average peeling strength in the range of 0.4±0.1 N, "good" was given to those in the range of 0.4±0.2 N, and "poor" was given to those with an average peeling strength outside the above range. The results are shown in the stability over time section of Tables 1, 2, 3 and 4.

(6) Breaking properties

In the same conditions as in the above section (4) sealing properties, heat sealing was performed on a polystyrene carrier tape such that the average peeling strength would be 0.5, 1.0 or 1.5 N or greater by adjusting the seal head temperature. The carrier tape heat-sealed with a cover tape was cut into 550 mm lengths, and the bottoms of the pockets of the carrier tape were attached to a vertical wall on which a double-sided tape was attached. 50 mm of the cover tape was peeled from the top of the attached carrier tape, the cover tape was clamped with a clip, and a weight with a mass of 1000 g was attached to the clip. Then, when the weight was allowed to fall freely, those with a peeling strength of 1.5 N without the cover tapes breaking were given "excellent", those with a peeling strength of 1.0 N without the cover tapes breaking were given "good", and those with a peeling strength of 1.0 N where breakage was observed were given "poor". Additionally, for those that did not satisfy the 1.0N peeling strength even at a sealing temperature of 190° C. were marked as "not evaluated". The results are shown in the breaking properties section of Tables 1, 2, 3 and 4.

(7) Surface resistivity

The surface resistivity of the heat seal layers was measured using HIRESTA UP MCP-HT450 of Mitsubishi Chemical Corporation in accordance with the method of JIS K6911 at a temperature of 23° C., in a 50% relatively humidity RH atmosphere and at an applied voltage of 10V. The results are shown in the surface resistivity section of Tables 1, 2, 3 and 4.

TABLE 1

| | | | Resin tensile storage modulus; Pa | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|---|
| | | Type of resin | | | | | | | | | | |
| Intermediate layer | m-LLDPE | a-1 UMERIT 0520F | | 100 | 100 | 100 | 100 | 100 | 100 | 100 | | |
| | m-LLDPE | a-2 HARMOREX NF464N | | | | | | | | | 100 | |
| | m-LLDPE | a-3 UMERIT 2540F | | | | | | | | | | 100 |
| | m-LLDPE | a-4 EVOLUE SP3010 | | | | | | | | | | |
| | m-LLDPE | a-5 EXCELLEN FX CX1001 | | | | | | | | | | |
| Peeling layer composition | resin | c-1 TUFTEC H1141 | 2.E+07 | 100 | 100 | | | | | | 100 | 100 |
| | resin | c-2 SEPTON 2002 | 1.E+07 | | | 100 | 100 | | | | | |
| | resin | c-3 TUFTEC P1500 | 1.E+07 | | | | | 100 | | | | |
| | resin | c-4 TUFTEC H1221 | 1.E+06 | | | | | | 100 | | | |
| | resin | c-5 EVAFLEX VA-45X | 8.E+06 | | | | | | | 100 | | |
| | resin | c-6 VYLONAL MD-1245 | 1.E+09 | | | | | | | | | |
| | resin | c-7 VYLON 630 | 2.E+08 | | | | | | | | | |
| | resin | c-8 PESRESIN A-645GH | 8.E+08 | | | | | | | | | |
| | resin | c-9 TUFTEC H1051 | 1.E+08 | | | | | | | | | |
| | resin | c-10 TUFTEC P2000 | 6.E+08 | | | | | | | | | |
| | resin | c-11 TUFTEC H1043 | 3.E+08 | | | | | | | | | |
| | resin | c-12 SEPTON 8104 | 5.E+08 | | | | | | | | | |
| | elec. cond. material | c-13 SNS-10T | | | | 800 | | | | | | |
| | elec. cond. material | c-14 FSS-10T | | | 400 | | 300 | 300 | 300 | 400 | 400 | 400 |
| | elec. cond. material | c-15 FS-10D | | | | | | | | | | |
| Heat seal layer composition | acrylic resin | d-1 DIANAL BR-116 | 2.E+09 | 100 | 100 | 100 | 100 | | | | 100 | |
| | acrylic resin | d-2 DIANAL BR-113 | 1.E+09 | | | | | 100 | 100 | 100 | | 100 |
| | acrylic resin | d-3 DIANAL BR-1122 | 2.E+08 | | | | | | | | | |
| | inorganic filler | e-1 MEK-ST-ZL | | 80 | 100 | 100 | 100 | 20 | 100 | 80 | 80 | 80 |
| Physical properties evaluation | base layer thickness: μm | | | 12 | 12 | 12 | 12 | 12 | 12 | 12 | 12 | 12 |
| | intermediate layer thickness: μm | | | 40 | 40 | 40 | 40 | 40 | 40 | 40 | 40 | 40 |
| | peeling layer thickness: μm | | | 0.8 | 1 | 0.8 | 0.7 | 0.8 | 1.5 | 0.8 | 1 | 1 |
| | heat seal layer thickness: μm | | | 1 | 1 | 1 | 1 | 1 | 2 | 0.6 | 1 | 1 |
| | cover tape thickness: μm | | | 53.8 | 54 | 53.8 | 53.7 | 53.8 | 55.5 | 53.4 | 54 | 54 |
| | tensile storage modulus ratio: heat seal layer resin/peeling layer resin | | | 1.0E+02 | 1.0E+02 | 2.0E+02 | 2.0E+02 | 1.0E+02 | 1.0E+03 | 1.3E+02 | 1.0E+02 | 5.0E+01 |
| | (1) haze value: % | | | 14 | 22 | 30 | 20 | 16 | 19 | 20 | 14 | 14 |
| | (2) part attachment | | | excel. | excel. | excel. | excel. | excel. | good | good | excel. | excel. |
| | (3) baking resistance | | | good | good | good | good | excel. | excel. | excel. | good | excel. |
| | (4) sealing properties | 1 to polycarbonate carrier tape | | excel. | excel. | excel. | excel. | excel. | excel. | good | good | excel. |
| | | 2 to polystyrene carrier tape | | excel. | excel. | excel. | excel. | excel. | excel. | good | good | excel. |
| | (5) stability over time | | | excel. | excel. | excel. | excel. | excel. | excel. | excel. | excel. | excel. |
| | (6) breaking properties | | | excel. | excel. | excel. | excel. | excel. | excel. | excel. | excel. | excel. |
| | (7) surface resistivity: Ω | | | >1.E+14 | 2.E+08 | 3.E+09 | 5.E+08 | 4.E+08 | 5.E+08 | 1.E+08 | 1.E+08 | 1.E+08 |

Note:
The number following "E" refers to number of digits. (Example: "1.E+07" is $1.00 \times 10^7$)

TABLE 2

| | | Type of resin | Resin tensile storage modulus; Pa | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 | Comp. Ex. 11 | Comp. Ex. 12 |
|---|---|---|---|---|---|---|---|---|---|---|---|---|---|---|---|
| Intermediate layer | m-LLDPE | a-1 UMERIT 0520F | 2.E-07 | | | | | | | | | | | | |
| | m-LLDPE | a-2 HARMOREX NF464N | 1.E-07 | | | | | | | | | | | | |
| | m-LLDPE | a-3 UMERIT 2540F | 1.E-07 | | 100 | | | | | | | | | | |
| | m-LLDPE | a-4 EVOLUE SP3010 | 1.E-06 | | | 100 | | | | | | | | | |
| | m-LLDPE | a-5 EXCELLEN FX CX1001 | 8.E-06 | 100 | | | 100 | 100 | 100 | 100 | 100 | 100 | 100 | 100 | 100 |
| Peeling layer composition | resin | c-1 TUFTEC H1141 | 1.E-09 | 100 | | | | | | | | | | | |
| | resin | c-2 SEPTON 2002 | 2.E-08 | | | | | | | | | | | | |
| | resin | c-3 TUFTEC P1500 | 8.E-08 | | | | | | | | | | | | |
| | resin | c-4 TUFTEC H1221 | 1.E-08 | | | | | | | | | | | | |
| | resin | c-5 EVAFLEX VA-45X | 6.E-08 | | | | | | | | | | | | |
| | resin | c-6 VYLONAL MD-1245 | 8.E-08 | | | 100 | 100 | | | | | | | | |
| | resin | c-7 VYLON 630 | 1.E-08 | | | | | | | | | | | | |
| | resin | c-8 PESRESIN A-645GH | | | | | | 100 | | | | | | | |
| | resin | c-9 TUFTEC H1051 | 6.E-08 | | | | | | 100 | | | | | | |
| | resin | c-10 TUFTEC P2000 | 3.E-08 | | | | | | | 100 | | | | | |
| | resin | c-11 TUFTEC H1043 | 5.E-08 | | | | | | | | 100 | | | | |
| | resin | c-12 SEPTON 8104 | | | | | | | | | | 100 | | | |
| | elec. cond. material | c-13 SNS-10T | 2.E-09 | | | | | | | | | | 100 | | |
| | elec. cond. material | c-14 FSS-10T | 1.E-09 | | | | | | | | | | | 100 | |
| | elec. cond. material | c-15 FS-10D | 2.E-08 | | | | | | | | | | | | 100 |
| Heat seal layer composition | acrylic resin | d-1 DIANAL BR-116 | | 400 | 400 | 400 | 300 | 400 | 300 | 400 | 400 | 400 | 400 | | 400 |
| | acrylic resin | d-2 DIANAL BR-113 | | 100 | 100 | 100 | 100 | 100 | 100 | 100 | 100 | 100 | 100 | | |
| | acrylic resin | d-3 DIANAL MD-1122 | | | | | 100 | | | | | | | | |
| | inorganic filler | e-1 MEK-ST-ZL | | | | | | | | | | | | | |
| Physical properties evaluation | base layer thickness: μm | | | 80 | 80 | 100 | 100 | 80 | 80 | 80 | 80 | 80 | 80 | 100 | 12 |
| | intermediate layer thickness: μm | | | 50 | 12 | 12 | 12 | 12 | 12 | 12 | 12 | 12 | 12 | 12 | 40 |
| | peeling layer thickness: μm | | | 0 | 30 | 40 | 40 | 40 | 40 | 40 | 40 | 40 | 40 | 40 | 1.5 |
| | heat seal layer thickness: μm | | | 0.8 | 1 | 0.8 | 1 | 1 | 1 | 1 | 1 | 1 | 1 | 0 | 0 |
| | cover tape thickness: μm | | | 1 | 44 | 1 | 1 | 1 | 1 | 1 | 1 | 1 | 1 | 1 | 53.5 |
| | tensile storage modulus ratio: heat seal layer resin/peeling layer resin | | | 51.8 | | 53.8 | 54 | 54 | 54 | 54 | 54 | 54 | 54 | 53 | — |
| | | | | 1.0E+02 | 1.0E+02 | 1.0E+02 | 2.0E+01 | 5.0E+00 | 1.3E+00 | 2.0E+00 | 1.7E+00 | 3.3E+00 | 4.0E+00 | — | |
| | (1) haze value: % | | | 21 | 28 | 22 | 18 | 20 | 20 | 18 | 20 | 20 | 20 | 14 | 14 |
| | (2) part attachment | | | excel. | excel. | good | poor | good | good | good | good | good | good | excel. | poor. |
| | (3) baking resistance | | | good | good | good | poor | poor | poor | poor | poor | poor | poor | good | poor. |
| | (4) sealing properties 1 to polycarbonate carrier tape | | | poor | poor | excel. | good. | poor. | excel. | good | good | good | poor | poor | excel. |
| | 2 to polystyrene carrier tape | | | poor | poor | poor | good | good | poor | good | poor | poor | good | poor | excel. |
| | (5) stability over time | | | not eval. | excel. | excel. | excel. | good | excel. | good | good | good | good | excel. | excel. |
| | (6) breaking properties | | | good | poor | poor | good | poor | poor | good | poor | poor | poor | poor | excel. |
| | (7) surface resistivity: Ω | | | 1.E+08 | 1.E+08 | 1.E+08 | 5.E+08 | 1.E+08 | 5.E+08 | 1.E+08 | 1.E+08 | 1.E+08 | 1.E+08 | >1.E+14 | 1.E+08 |

TABLE 3

| | | Type of resin | | Resin tensile storage modulus; Pa | Ex. 10 | Ex. 11 | Ex. 12 | Ex. 13 | Ex. 14 | Ex. 15 | Ex. 16 | Ex. 17 |
|---|---|---|---|---|---|---|---|---|---|---|---|---|
| Intermediate layer | m-LLDPE | a-1 | UMERIT 0520F | | 100 | 100 | 100 | 100 | 100 | | | |
| | m-LLDPE | a-2 | HARMOREX NF464N | | | | | | | | 100 | 100 | |
| | m-LLDPE | a-3 | UMERIT 2540F | | | | | | | | | | 100 |
| | m-LLDPE | a-4 | EVOLUE SP3010 | | | | | | | | | | |
| | m-LLDPE | a-5 | EXCELLEN FX CX1001 | | | | | | | | | | |
| Peeling layer composition | resin | c-1 | TUFTEC H1141 | 2.E+07 | 100 | | | | | 100 | 100 | 100 |
| | resin | c-2 | SEPTON 2002 | 1.E+07 | | 100 | | | | | | |
| | resin | c-3 | TUFTEC P1500 | 1.E+07 | | | 100 | | | | | |
| | resin | c-4 | TUFTEC H1221 | 1.E+06 | | | | 100 | | | | |
| | resin | c-5 | EVAFLEX VA-45X | 8.E+06 | | | | | 100 | | | |
| | resin | c-6 | VYLONAL MD-1245 | 1.E+09 | | | | | | | | |
| | resin | c-7 | VYLON 630 | 2.E+08 | | | | | | | | |
| | resin | c-8 | PESRESIN A-645GH | 8.E+08 | | | | | | | | |
| | resin | c-9 | TUFTEC H1051 | 1.E+08 | | | | | | | | |
| | resin | c-10 | TUFTEC P2000 | 6.E+08 | | | | | | | | |
| | resin | c-11 | TUFTEC H1043 | 3.E+08 | | | | | | | | |
| | resin | c-12 | SEPTON 8104 | 5.E+08 | | | | | | | | |
| Heat seal layer composition | acrylic resin | d-1 | DIANAL BR-116 | 2.E+09 | 100 | 100 | | | | 100 | | |
| | acrylic resin | d-2 | DIANAL BR-113 | 1.E+09 | | | 100 | 100 | 100 | | | 100 |
| | acrylic resin | d-3 | DIANAL BR-1122 | 2.E+08 | | | | | | | 100 | |
| | elec. cond. material | d-4 | CNF-T/Anone | | 8 | 8 | 7 | 8 | 3 | 15 | 15 | 10 |
| | inorganic filler | e-1 | MEK-ST-ZL | | 30 | 80 | 20 | 100 | 80 | 80 | 100 | 60 |
| Physical properties evaluation | base layer thickness: μm | | | | 12 | 12 | 12 | 12 | 12 | 12 | 12 | 12 |
| | intermediate layer thickness: μm | | | | 40 | 40 | 40 | 40 | 40 | 40 | 40 | 40 |
| | peeling layer thickness: μm | | | | 1 | 0.8 | 0.8 | 1.5 | 0.8 | 1 | 1 | 1 |
| | heat seal layer thickness: μm | | | | 0.8 | 1 | 1 | 2 | 0.6 | 1 | 1 | 1 |
| | cover tape thickness: μm | | | | 53.8 | 53.8 | 53.8 | 55.5 | 53.4 | 54 | 54 | 54 |
| | tensile storage modulus ratio: d/c | | | | 1.0E+02 | 2.0E+02 | 1.0E+02 | 1.0E+03 | 1.3E+02 | 1.0E+02 | 1.3E+01 | 5.0E+01 |
| | (1) haze value: % | | | | 11 | 12 | 9 | 13 | 12 | 12 | 12 | 12 |
| | (2) part attachment | | | | excel. | excel. | excel. | good | good | excel. | good | excel. |
| | (3) baking resistance | | | | good | good | excel. | excel. | excel. | good | good | excel. |
| | (4) sealing properties | 1 to polycarbonate carrier tape | | | excel. | excel. | excel. | excel. | good | good | excel. | good |
| | | 2 to polystyrene carrier tape | | | excel. | excel. | excel. | excel. | good | good | excel. | good |
| | (5) stability over time | | | | excel. | excel. | excel. | excel. | excel. | excel. | excel. | excel. |
| | (6) breaking properties | | | | excel. | excel. | excel. | excel. | excel. | excel. | excel. | excel. |
| | (7) surface resistivity: Ω | | | | 9.E+07 | 9.E+07 | 3.E+08 | 2.E+07 | 4.E+10 | 1.E+07 | 1.E+07 | 5.E+07 |

Note:
The number following "E" refers to number of digits. (Example: "1.E+07" is $1.00 \times 10^7$)

TABLE 4

| | | Type of resin | | Resin tensile storage modulus; Pa | Comp. Ex. 13 | Comp. Ex. 14 | Comp. Ex. 15 | Comp. Ex. 16 | Comp. Ex. 17 | Comp. Ex. 18 | Comp. Ex. 19 | Comp. Ex. 20 | Comp. Ex. 21 | Comp. Ex. 22 | Comp. Ex. 23 | Comp. Ex. 24 |
|---|---|---|---|---|---|---|---|---|---|---|---|---|---|---|---|---|
| Intermediate layer | m-LLDPE | UMERIT 0520F | a-1 | | | | | | | | | | | | | |
| | m-LLDPE | HARMOREX NF464N | a-2 | | | | | | | | | | | | | |
| | m-LLDPE | UMERIT 2540F | a-3 | | | 100 | | | | | | | | | | |
| | m-LLDPE | EVOLUE SP3010 | a-4 | | | | 100 | | | | | | | | | |
| | m-LLDPE | EXCELLEN FX CX1001 | a-5 | | 100 | 100 | 100 | 100 | 100 | 100 | 100 | 100 | 100 | 100 | 100 | 100 |
| Peeling layer composition | resin | TUFTEC H1141 | c-1 | 2.E-07 | | | | | | | | | | | | |
| | resin | SEPTON 2002 | c-2 | 1.E-07 | | | | | | | | | | | | |
| | resin | TUFTEC P1500 | c-3 | 1.E-07 | | | | | | | | | | | | |
| | resin | TUFTEC H1221 | c-4 | 1.E-06 | | | | | | | | | | | | |
| | resin | EVAFLEX VA-45X | c-5 | 8.E-06 | | | | | | | | | | | | |
| | resin | VYLONAL MD-1245 | c-6 | 1.E-09 | | | | | 100 | | | | | | | |
| | resin | VYLON 630 | c-7 | 2.E-08 | | | | | | | | | | | | |
| | resin | PESRESIN A-645GH | c-8 | 8.E-08 | | | | | | 100 | | | | | | |
| | resin | TUFTEC H1051 | c-9 | 1.E-08 | | | | | | | 100 | | | | | |
| | resin | TUFTEC P2000 | c-10 | 6.E-08 | | | | | | | | 100 | | | | |
| | resin | TUFTEC H1043 | c-11 | 3.E-08 | | | | | | | | | 100 | | | |
| | resin | SEPTON 8104 | c-12 | 5.E-08 | | | | | | | | | | 100 | | |
| Heat seal composition | acrylic resin | DIANAL BR-116 | d-1 | 2.E-09 | 100 | | | 100 | 100 | 100 | 100 | 100 | 100 | 100 | | |
| | acrylic resin | DIANAL BR-113 | d-2 | 1.E-09 | | | | | | | | | | | 100 | |
| | acrylic resin | DIANAL BR-1122 | d-3 | 2.E-08 | | | | | | | | | | | | 100 |
| | elec. cond. material | CNF-T/Anone | d-4 | | | | | | | | | | | | | |
| | inorganic filler | MEK-ST-ZL | e-1 | | | | | | | | | | | | | |
| Physical properties evaluation | base layer thickness: µm | | | | 8 | 8 | 8 | 12 | 7 | 7 | 7 | 7 | 7 | 7 | 7 | 12 |
| | intermediate layer thickness: µm | | | | 80 | 80 | 100 | 100 | 100 | 80 | 80 | 80 | 80 | 80 | 80 | 40 |
| | peeling layer thickness: µm | | | | 50 | 30 | 12 | | | 12 | 12 | 12 | 12 | 12 | 12 | |
| | heat seal layer thickness: µm | | | | 0.8 | 1 | 40 | 40 | 40 | 40 | 40 | 40 | 40 | 40 | 40 | |
| | cover tape thickness: µm | | | | 1 | 1 | 0.8 | 0.8 | 0.8 | 0.8 | 0.8 | 0.8 | 0.8 | 0.8 | 0.8 | 1.5 |
| | tensile storage modulus ratio: d/c | | | | 51.8 | 44 | 53.8 | 53.8 | 1 | 1 | 1 | 1 | 1 | 1 | 1 | 0 |
| | (1) haze value: % | 1 to polycarbonate carrier tape | | | 1.0E+02 | 1.0E+02 | 1.0E+02 | 1.0E+02 | 1.0E+00 | 5.0E+00 | 1.3E+00 | 2.0E+00 | 1.7E+00 | 3.3E+00 | 4.0E+00 | 53.5 |
| | (2) part attachment | 2 to polystyrene carrier tape | | | 10 | 11 | 14 | 5 | 13 | 13 | 14 | 13 | 13 | 14 | 14 | 14 |
| | (3) baking resistance | | | | excel. | excel. | good | good | excel. | good | good | good | good | good | good | poor. |
| | (4) sealing properties | | | | good | good | poor | poor | good | poor | poor | poor | good | poor | good | poor |
| | (5) stability over time | | | | poor | poor | poor | excel. | poor | poor | poor | poor | poor | poor | poor | excel. |
| | (6) breaking properties | | | | not eval. | excel. | excel. | poor | excel. | poor | poor | poor | poor | poor | good | excel. |
| | (7) surface resistivity: Ω | | | | 9.E+07 | 9.E+07 | 2.E+08 | >1.E+14 | 7.E+08 | 1.E+08 | 1.E+08 | 1.E+08 | 1.E+08 | 1.E+08 | 1.E+08 | >1.E+14 |

DESCRIPTION OF REFERENCE NUMBERS

1 Cover tape
2 Base layer (A)
3 Anchor coating layer
4 Intermediate layer (B)
5 Peeling layer (C)
6 Heat seal layer (D)

The invention claimed is:

1. A cover tape comprising at least a base layer (A), an intermediate layer (B), a peeling layer (C) which comprises a thermoplastic resin as a main component, and a heat seal layer (D) which comprises a thermoplastic resin as a main component heat-sealable to a carrier tape, wherein
the thermoplastic resin forming the peeling layer (C) has a tensile storage modulus (c) of at least $1\times10^6$ Pa and at most $1\times10^8$ Pa at 23° C.;
the thermoplastic resin forming the heat seal layer (D) has a tensile storage modulus (d) of at least $1\times10^8$ Pa and at most $1\times10^{10}$ Pa at 23° C.;
a ratio between (c) and (d) is $1\times10^4 \geq (d)/(c) \geq 1\times10$;
the intermediate layer (B) comprises a linear low density polyethylene having a density in the range of 0.900 to $0.925\times10^3$ kg/m$^3$; and
the thermoplastic resin in the peeling layer (C) consists of a resin selected from an ethylene-vinyl acetate copolymer resin, a styrene-butadiene copolymer resin, a hydrogenated styrene-butadiene copolymer, a styrene-isoprene copolymer resin and a hydrogenated styrene-isoprene copolymer resin.

2. The cover tape according to claim 1, wherein the thermoplastic resin in the peeling layer (C) consists of an ethylene-vinyl acetate copolymer resin.

3. The cover tape according to claim 1, wherein the thermoplastic resin constituting the heat seal layer (D) comprises any one of, or a combination of two or more of, an acrylic resin, an ester resin and a styrene resin.

4. The cover tape according to claim 1, wherein the resin constituting the intermediate layer (B) comprises a metallocene linear low density polyethylene resin.

5. The cover tape according to claim 1, wherein at least one of the peeling layer (C) and the heat seal layer (D) further comprises 2 to 15 parts by mass of a carbon nanomaterial with respect to 100 parts by mass of the thermoplastic resin constituting the layer.

6. The cover tape according to claim 1, wherein the thermoplastic resin in the peeling layer (C) consists of a styrene-butadiene copolymer resin.

7. The cover tape according to claim 1, wherein the thermoplastic resin in the peeling layer (C) consists of a hydrogenated styrene-butadiene copolymer.

8. The cover tape according to claim 1, wherein the thermoplastic resin in the peeling layer (C) consists of a styrene-isoprene copolymer resin.

9. The cover tape according to claim 1, wherein the thermoplastic resin in the peeling layer (C) consists of a hydrogenated styrene-isoprene copolymer resin.

10. The cover tape according to claim 1, which has a total light transmittance of at least 70%.

11. The cover tape according to claim 10, which has a haze value of at most 30%.

12. The cover tape according to claim 10, which has a haze value of at most 15%.

13. The cover tape according to claim 1, wherein the peeling layer (C) further comprises an electrically conductive material.

14. The cover tape according to claim 1, wherein the heat seal layer (D) further comprises an electrically conductive material.

15. The cover tape according to claim 1, wherein at least one of the peeling layer (C) and the heat seal layer (D) further comprises a microparticle.

16. The cover tape according to claim 15, wherein the microparticle is antimony-doped tin oxide.

* * * * *